United States Patent [19]

Simmons

[11] 3,975,984

[45] Aug. 24, 1976

[54] SELF ALIGNING COLLECT FOR MACHINE TOOLS

[75] Inventor: Gerald P. Simmons, Washington, Ill.

[73] Assignee: Caterpillar Tractor Co., Peoria, Ill.

[22] Filed: Sept. 19, 1975

[21] Appl. No.: 615,020

[52] U.S. Cl. .................................. 90/11 D; 279/51; 279/103; 408/239 R
[51] Int. Cl.² ............................................. B23C 5/26
[58] Field of Search .......... 90/11 D, 11 A; 408/238, 408/239, 239 A, 240; 279/51, 53, 103

[56] References Cited
UNITED STATES PATENTS

| | | | |
|---|---|---|---|
| 2,860,547 | 11/1958 | Stephan | 90/11 D |
| 3,651,739 | 3/1972 | Woit | 90/11 D |
| 3,868,886 | 4/1975 | Bowdie | 90/11 D |

Primary Examiner—Othell M. Simpson
Assistant Examiner—Z. R. Bilinsky
Attorney, Agent, or Firm—Phillips, Moore, Weissenberger, Lempio & Strabala

[57] ABSTRACT

The invention is concerned with an improvement in a machine tool gripping assembly of the type which comprises a housing with a bore therewithin and a collet slidable toward and retractable from a spindle facing end portion of said bore, the collet having extending from a spindle facing end thereof a plurality of resilient leaves each attached at one end to said collet and separated at a spindle gripping end thereof, each of said leaves having a first annular cam surface adjacent said spindle gripping end thereof, said surface being formed at a selected angle with respect to the longitudinal axis of said collet. The improvement comprises a floating collar in said bore adjacent the spindle gripping end of said leaves, said collar having a second annular cam surface at generally the same angle as said first cam surface, an inner generally cylindrical surface of said collar urging said spindle gripping ends of said leaves towards one another when said collet is retracted into said bore and an outer generally cylindrical surface of said collar floating clear of the spindle facing end portion of said bore. The improvement further includes means supported by said bore adjacent said spindle facing end portion thereof for stopping said collar from sliding into said bore. Also, the improvement includes means for preventing said collar from sliding out of said spindle facing end portion of said bore, the ends of said collar floating clear of said stopping means and said preventing means.

3 Claims, 3 Drawing Figures

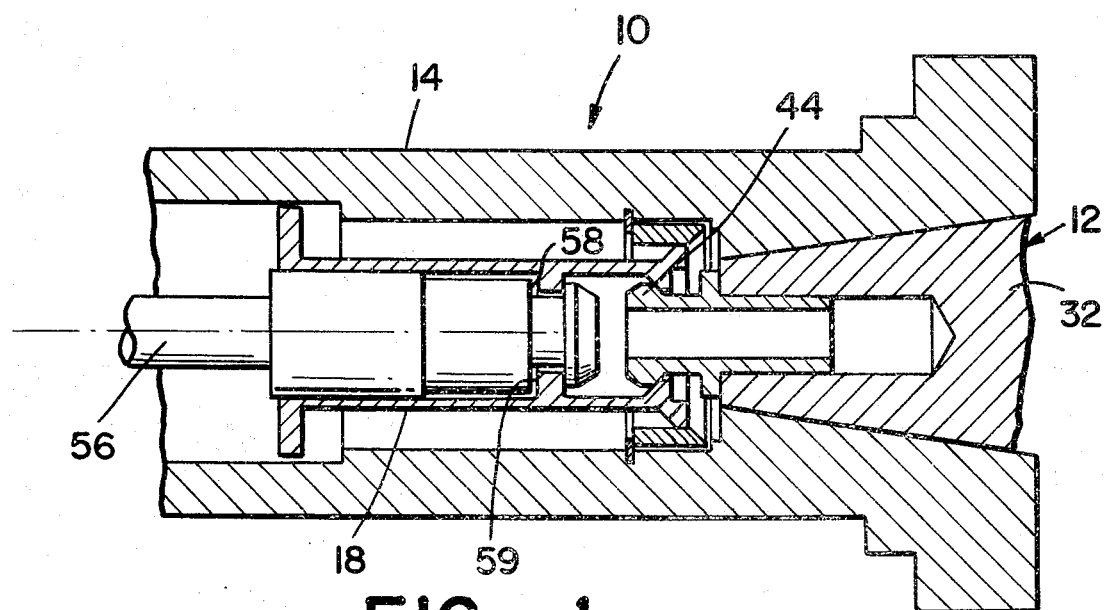
FIG_1
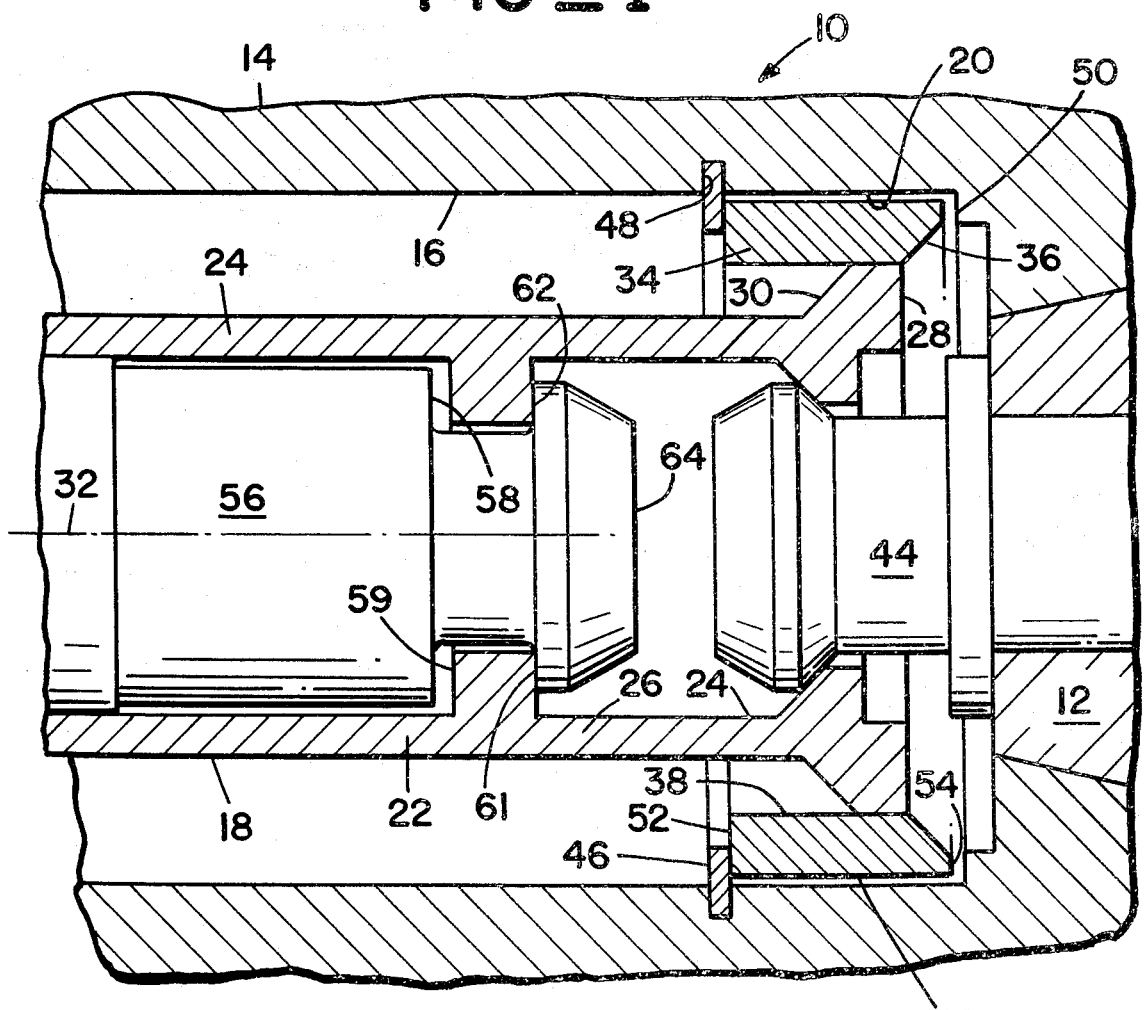
FIG_2

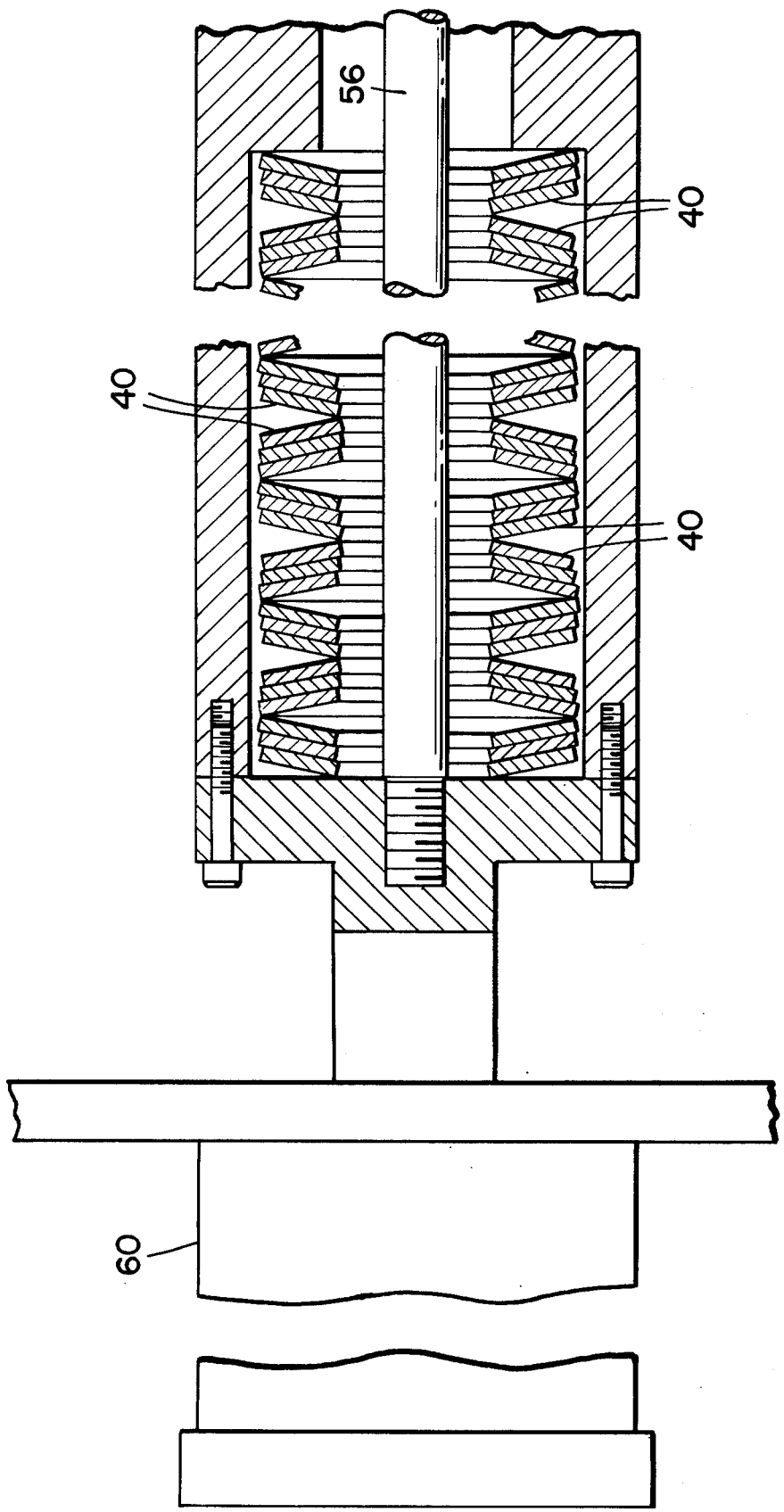

SELF ALIGNING COLLECT FOR MACHINE TOOLS

BACKGROUND OF THE INVENTION

1. Field of the Invention

The invention is concerned with an improvement in a machine tool gripping assembly. The improvement is in the form of a floating collar in a bore within a housing, the floating collar being adjacent the spindle gripping end of a plurality of resilient leaves which are attached at one end to a collet and are separated at a spindle gripping end thereof, said collet being slidable toward and retractable from a spindle facing end portion of the bore. The floating collar includes an annular cam surface and each of the leaves has a matching cam surface adjacent the spindle gripping end thereof whereby the two cam surfaces slide against one another as the collet is slid into and out of the bore. An inner surface of the collar urges the spindle gripping end of the leaves towards one another when the collet is retracted into the bore and an outer generally cylindrical surface of the collar floats clear of the spindle facing end portion of the bore. Means are provided supported by the bore adjacent the spindle facing end portion thereof for stopping the collar from sliding into the bore and means are provided for preventing the collar from sliding out of the spindle facing end portion of the bore, the ends of the collar floating clear of the stopping means and of the preventing means. In this manner, failure of the leaves due to the added stress caused by misalignment thereof relative to the spindle of the machine tool being gripped is virtually eliminated.

Prior Art

Machine tool spindle gripping assemblies which include a collet with a plurality of leaves which open widely at a spindle facing end portion of a bore in which the collet sits are well known to the prior art. It is also known to provide cam surfaces both within the bore and upon the leaves to aid in the sliding of the collet and leaves relative to the bore. Such structures are taught, for example, in both of U.S Pat. Nos. 3,177,775 and 3,863,940. Neither of the above-mentioned patents, however, has any provision for relieving strain which develops in the leaves which extend from the collet shown therein due to any possible misalignment between the machine tool spindle or more particularly between the knob extending therefrom and the collet and leaves extending therefrom which grip such a knob. A very serious problem has been found to exist with the prior art machine tool spindle gripping assemblies and this problem has been that the leaves which extend from the collets of such assemblies and grip knobs which extend from machine tool spindles fail very rapidly under wear and require relatively frequent replacement because of the above-mentioned lack of alignment and the resulting stress fatigue and eventual failure of the leaves which are attached to the collet.

The above-mentioned problem of leaf failure has been attacked by the relevant industry. For example, Sunstrand Co. produces a machine tool spindle gripping assembly of the type mentioned above but which includes within the bore thereof a relatively long sleeve extending at one end thereof from a piston member, which is firmly held in place on the opposite end thereof from said sleeve by spring means, the other end of said sleeve being held in place by an annular shoulder extending inwardly from the bore. The sleeve of this design has an outer diameter which is slightly smaller than the inner diameter of the bore whereby relative misalignment between the knob of the machine tool spindle and the leaves extending from the collet produces a reduced strain on said leaves since said sleeve, which can move along with said collet because of its radially floating nature (because of the clearance between the outer diameter of the sleeve and the inner diameter of the bore), takes up at least a portion of the forces produced by the aforementioned lack of alignment. Because of the length of such a sleeve, however, and further because both ends of such a sleeve are pressed between the aforementioned shoulder on the bore and the piston member, the amount of misalignment which can be tolerated is somewhat limited. It would clearly be highly desirable to solve the above-mentioned problem of leaf failure in an inexpensive and yet positive manner. The present invention is concerned with an improvement in a machine tool spindle gripping assembly which solves precisely the above set out problem and which further solves it in a manner which requires a minimal amount of expensive machining and which further provides an assembly which is easy to assemble and/or repair.

SUMMARY OF THE INVENTION

The invention is concerned with an improvement in a machine tool spindle gripping assembly which comprises a housing with a bore therewithin and a collet slidably toward and retractable from a spindle facing end portion of said bore. The collet of the assembly has extending from a spindle facing end thereof a plurality of resilient leaves each attached at one end to the collet and separated at a spindle gripping end thereof. As with many such assemblies each of the leaves has a first annular cam surface adjacent the spindle gripping end thereof, the surface being formed at a selected angle with respect to longitudinal axis of the collet. The improvement of the invention comprises a floating collar in the bore adjacent the spindle gripping end of the leaves, the collar having a second annular cam surface at generally the same angle as the first cam surface, an inner generally cylindrical surface of the collar urging the spindle gripping ends of the leaves towards one another when the collar is retracted into the bore and an outer generally cylindrical surface of the collar floating clear of the spindle facing end portion of the bore. Also part of the improvement are means supported by the bore adjacent the spindle facing end portion thereof for stopping the collar from sliding into the bore and means for preventing the collar from sliding out of the spindle facing end portion of the bore. The ends of the collar float clear of the stopping means and the preventing means.

BRIEF DESCRIPTION OF THE DRAWINGS

The invention will be better understood by reference to the figures of the drawing and other objects of the invention will become apparent from examination of the description which follows, and most particularly from examination of the figures of the drawings wherein like numbers denote like parts throughout and wherein:

FIG. 1 illustrates in sectional view the preferred embodiment of the assembly of the present invention with a machine tool spindle in place therein;

FIG. 2 is an enlarged partially sectioned view illustrating the improvement of the present invention; and FIG. 3 is an enlarged elevational view, partly in section and partly broken away showing mechanism for activating the assembly illustrated in FIGS. 1 and 2.

DETAILED DESCRIPTION OF THE PREFERRED EMBODIMENT

The improved machine tool spindle gripping assembly of the present invention is indicated generally by the numeral 10. As illustrated in FIGS. 1 and 2 the assembly 10 has gripped therein a spindle 12 of a machine tool. The assembly 10 includes a housing 14 with a bore 16 therewithin and a collet 18 slidable toward and retractable from a spindle facing end portion 20 of the bore 16. The collet 18 has extending from a spindle facing end 22 thereof a plurality of resilient leaves 24 each attached at one end 26 to said spindle facing end 22 of said collet 18. The leaves 24 are separated at a spindle gripping end 28 thereof. Each of the leaves 24 has a first annular cam surface 30 adjacent the spindle gripping end 28 thereof. The first annular cam surface 30 is formed at a selected angle with respect to the longitudinal axis 32 of the collet 18.

A relatively short floating collar 34 is positioned in the bore 16 adjacent the spindle. Thus, the collar 34 is positioned within the spindle facing end portion 20 of the bore 16. The collar 34 has a second annular cam surface 36 at generally the same angle as the first annular cam surface 30 adjacent the spindle gripping end 28 of the leaves 24. An inner generally cylindrical surface 38 of the collar 34 serve to urge the spindle gripping ends 28 of the plurality of leaves 24 towards one another when the collet 18 is retracted into the bore 16, i.e., towards the bellville washers 40. An outer generally cylindrical surface 42 of the collar 34 is spaced apart from and floats clear of the spindle facing end portion 20 of the bore 16. This is important since in this instance the collar 34 can fluctuate within the spindle facing end portion 20 of the bore 16 if the collet 18 is not properly aligned with the spindle 12 and more particularly can fluctuate with the knob 44 which extends therefrom and is gripped by the plurality of leaves 24 thus relieving strain on the individual leaves 24.

Means are provided supported by the bore 16 adjacent the spindle facing end portion 20 thereof for stopping the collar 34 from sliding into the bore 16 towards the bellville washers 40. In the embodiment illustrated, the means which are supported by the bore 16 for stopping the collar 34 from sliding into the bore 16 comprise a retaining ring 46 held in place within an undercut 48 in the spindle facing end portion 20 of the bore 16. The retaining ring 46 is generally put in place as by sliding it in from the left of FIG. 1 when the bore is empty except for the presence of the collar 34. The retaining ring 46 is generally compressed while it is being slid along the bore 16 and into the undercut 48 and then as it is released it springs outwardly in a well known manner to sit in the undercut 48 and to project therefrom and thereby provide the stopping means for the collar 34.

Means are also provided for preventing the collar 34 from sliding out of the spindle facing end portion 20 of the bore 16. In the embodiment illustrated the preventing means comprises a shoulder 50 which extends inwardly from the bore 16 at the spindle facing end portion 20 thereof. The separation between the retaining ring 46 and the shoulder 50 is important in that the ends 52 and 54 of the collar 34 float clear of both the shoudler 50 and the retaining ring 46 in spaced relationship therebetween thus allowing easy non-binding rotation of the collar 34 about the axis 32 of the collet 18. As will be apparent from examination of FIGS. 1 and 2 in particular, the floating collar 34 preferably terminates short of the collet 18 to make insertion of the collar 34 as easy as possible. In this manner, great freedom can be assured for the movement of the floating collar 34 within the spindle facing end portion 30 of the bore 16.

Reference to the Figures will make clear the operation of the assembly 10. Briefly, in order to either grip or release a knob 44 of a spindle 12, the collet 18 is forced rightwardly as by the action of a drawbar 56 acting against said collet 18 as, for example, to contact a shoulder 58 of the drawbar 56 with a shoulder 59 of the collet 18. The drawbar is forced towards the spindle facing end portion 20 of the bore 16 through action of the hydraulic (or pneumatic) motor 60 or the like in a conventional manner. Normally, the draw bar 56 and hence the collet 18, via a shoulder 61 of the drawbar 56 acting against a shoulder 62 of the collet 18, is biased away from the spindle facing end portion 20 of the bore 16 by biasing means such as the bellville washers 40. Thus, the hydraulic motor 60 is used to overcome the normal biasing of the bellville washers. A knob 44 of a spindle 12 of a machine tool is then either inserted or removed from between the spindle gripping ends 28 of the plurality of leaves 24.

An extending pushing means, namely a pusher 64, travels forwardly with the drawbar 56 and serves to contact the knob 44 and to propel it and thereby the spindle 12 out of contact with the spindle gripping end 28 of the plurality of leaves 24. The pusher 64 is generally removable for each assembly and repair of the assembly 10. Other pushing means can also be used. For example, pushing means can be used which extend from the leaves 24 and contact the knob 44 or the spindle 12.

While the invention has been described in connection with specific embodiments thereof, it will be understood that it is capable of further modification, and this application is intended to cover any variations, uses or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

That which is claimed is:

1. In a machine tool spindle gripping assembly which comprises a housing with a bore therewithin and a collet slidable toward and retractable from a spindle facing end portion of said bore, said collet having extending from a spindle facing end thereof a plurality of resilient leaves each attached at one end to said collet and separated at a spindle gripping end thereof, each of said leaves having a first annular cam surface adjacent said spindle gripping end thereof, said surface being formed at a selected angle with respect to the longitudinal axis of said collet, the improvement comprising:

a floating collar in said bore adjacent the spindle gripping end of said leaves, said collar having a second annular cam surface at generally the same angle as said first annular cam surface, an inner generally cylindrical surface of said collar urging said spindle gripping ends of said leaves towards one another when said collet is retracted into said bore, an outer generally cylindrical surface of said collar floating clear of the spindle facing end portion of said bore;

means supported by said bore adjacent said spindle facing end portion thereof for stopping said collar from sliding into said bore; and means for preventing said collar from sliding out of said spindle facing end portion of said bore, the ends of said collar floating clear of said stopping means and said preventing means.

2. An improvement in a gripping assembly as in claim 1, wherein said stopping means comprises a retaining ring and said spindle facing end portion of said bore includes an undercut into which said retaining ring fits.

3. An improvement in a gripping assembly as in claim 1, wherein said floating collar terminates short of said collet.

* * * * *